United States Patent
Gabe et al.

(10) Patent No.: US 8,109,080 B2
(45) Date of Patent: Feb. 7, 2012

(54) METHOD OF CONTROLLING NOX PURIFICATION SYSTEM AND NOX PURIFICATION SYSTEM

(75) Inventors: Masashi Gabe, Fujisawa (JP); Daiji Nagaoka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 261 days.

(21) Appl. No.: 12/451,422

(22) PCT Filed: Apr. 16, 2008

(86) PCT No.: PCT/JP2008/057434
§ 371 (c)(1),
(2), (4) Date: Nov. 12, 2009

(87) PCT Pub. No.: WO2008/142929
PCT Pub. Date: Nov. 27, 2008

(65) Prior Publication Data
US 2010/0115924 A1    May 13, 2010

(30) Foreign Application Priority Data
May 16, 2007 (JP) .................................. 2007-130123

(51) Int. Cl.
*F01N 3/00* (2006.01)
(52) U.S. Cl. ................................ 60/286; 60/276; 60/295
(58) Field of Classification Search ...................... 60/286
See application file for complete search history.

(56) References Cited

U.S. PATENT DOCUMENTS

| 6,244,046 | B1* | 6/2001 | Yamashita | 60/285 |
| 6,338,243 | B1* | 1/2002 | Takaoka et al. | 60/277 |
| 7,010,907 | B2* | 3/2006 | Matsubayashi et al. | 60/277 |
| 2002/0007627 | A1* | 1/2002 | Hashimoto | 60/277 |
| 2002/0012623 | A1 | 1/2002 | Gobel et al. | |
| 2004/0055278 | A1* | 3/2004 | Miyoshi et al. | 60/272 |

(Continued)

FOREIGN PATENT DOCUMENTS

DE    198 23 921    12/1999

(Continued)

OTHER PUBLICATIONS

Supplementary European Search Report issued in European Application No. 08740513.0 dated May 3, 2011.

(Continued)

*Primary Examiner* — Thomas Denion
*Assistant Examiner* — Jason Shanske
(74) *Attorney, Agent, or Firm* — Staas & Halsey LLP

(57) ABSTRACT

In a NOx purification system 1 provided with a NOx occlusion reduction catalyst 20 and a control unit 30 which executes a NOx regeneration control and a sulfur poisoning regeneration control, a binary λ sensor 26 and a reducing agent concentration sensor 25 for detecting a concentration of the reducing agent are disposed downstream of the NOx occlusion reduction catalyst 20. The level of deterioration of the NOx occlusion reduction catalyst 20 caused by sulfur poisoning is estimated on the basis of a time period Ta from a time point T3 at which a marked decrease of oxygen concentration is detected by the binary λ sensor 26 to the time point T2 at which the marked increase of the oxygen concentration is detected by the reducing agent concentration sensor 25 under the NOx regeneration control. Accordingly, the sulfur poisoning amount is accurately estimated and by performing the sulfur poisoning regeneration at an appropriate frequency, any excessive sulfur poisoning regeneration can be avoided, thereby preventing deterioration of mileage.

4 Claims, 2 Drawing Sheets

U.S. PATENT DOCUMENTS

| | | | |
|---|---|---|---|
| 2004/0103650 A1* | 6/2004 | Miyashita | 60/285 |
| 2004/0112043 A1 | 6/2004 | Matsubayashi et al. | |
| 2004/0163381 A1* | 8/2004 | Shirakawa et al. | 60/285 |
| 2004/0250532 A1* | 12/2004 | Miura et al. | 60/277 |
| 2005/0132698 A1* | 6/2005 | Nagaoka et al. | 60/295 |

FOREIGN PATENT DOCUMENTS

| | | |
|---|---|---|
| EP | 1 146 207 | 10/2001 |
| EP | 1 384 866 | 1/2004 |
| EP | 1547668 | 6/2005 |
| JP | 2000-8920 | 1/2000 |
| JP | 2000-45754 | 2/2000 |
| JP | 2002-47919 | 2/2002 |
| JP | 2004-124799 | 4/2004 |
| JP | 2006-322397 | 11/2006 |
| WO | 2006/123564 | 11/2006 |

OTHER PUBLICATIONS

Abstract of WO 99/61770 corresponding to DE 198 23 921.
Chinese Office Action dated Jun. 9, 2011 in Appln. No. 2000880016283.1.
Patent Abstracts of Japan, Publication No. 2002-047949, Published Feb. 15, 2002.
Patent Abstracts of Japan, Publication No. 2006-322397, Published Nov. 30, 2006.
Patent Abstracts of Japan, Publication No. 2000-8920, Published Jan. 11, 2000.
Patent Abstracts of Japan, Publication No. 2000-45754, Published Feb. 15, 2000.
Patent Abstracts of Japan, Publication No. 2004-124799, Published Apr. 22, 2004.
International Search Report of the International Published Application No. PCT/JP2008/057434 (mailed Jul. 29, 2008).

* cited by examiner

METHOD OF CONTROLLING NOX PURIFICATION SYSTEM AND NOX PURIFICATION SYSTEM

CROSS REFERENCE TO RELATED APPLICATIONS

This application claims the benefit under U.S.C. Section 371, of PCT International Application No. PCT/JP2008/057434, filed Apr. 16, 2008 and Japanese Application No. 2007-130123 filed May 16, 2007, the contents of which are incorporated herein by reference.

TECHNICAL FIELD

The present invention relates to a method of controlling a NOx purification system and a NOx purification system, provided with a NOx occlusion reduction catalyst for purifying a NOx (nitrogen oxide) contained in the exhaust gas of an internal combustion engine.

BACKGROUND ART

Emission control with respect to PM (particulate matter), NOx, CO, HC and the like, discharged from the diesel engine has been increasing year by year. A mere improvement of the engine is no longer sufficient to achieve the regulation values which have been getting more severe accompanied with the enhanced control. The technique for reducing the aforementioned substances discharged from the engine has been introduced by mounting an exhaust gas after-treatment device in the exhaust passage of the engine.

In consideration of the above-described circumstances, various studies and proposals have been made with respect to the NOx catalyst for reducing and removing the NOx (nitrogen oxide) contained in the exhaust gas discharged from the internal combustion engine such as the diesel engine or a gasoline engine of a certain type, and various types of combustion units. Among them, there is a NOx occlusion reduction catalyst as a NOx-reducing catalyst for the diesel engine. This NOx occlusion reduction catalyst can be used for effectively purifying the NOx in the exhaust gas.

The NOx occlusion reduction catalyst is formed by a monolithic honeycomb and the like, and is composed by forming plural polygonal cells on a carrier as the structure formed of cordierite, silicon carbide (SiC), or ultra-thin stainless steel of the monolithic honeycomb. A porous catalytic coat layer formed of alumina ($Al_2O_3$), zeolite, silica, various types of oxides and the like, which is expected to serve as a catalyst carrier layer, is applied to a wall surface of the cell. A catalyst noble metal (catalytically active metal) which exhibits the oxidizing function and a NOx occlusion agent (NOx occlusion substance: NOx occlusion material: NOx absorbing agent) which exhibits the NOx occlusion function are carried on the surface of the catalytic coat layer. The catalyst noble metal is formed of platinum (Pt) and the like. The NOx occlusion agent is formed of some of the materials selected from the alkali metals such as potassium (K), sodium (Na), lithium (Li), and cesium (Cs), the alkali earth metals such as barium (Ba) and calcium (Ca), the rare earths such as lanthanum (La) and yttrium (Y) and the like. These fulfill three functions of NOx occlusion, NOx release, and NOx purification depending on the oxygen concentration in the exhaust gas.

When the NOx occlusion capacity nearly reaches the saturation by occluding the NOx in the NOx occlusion agent at the time of normal operation, the NOx occlusion reduction catalyst brings the air/fuel ratio of the inflow exhaust gas into a rich state. As a result, the occluded NOx is released, and the released NOx is reduced through the use of a three-way function of the catalyst noble metal.

More specifically, in the case where the air/fuel ratio of the exhaust gas is in the lean state in which oxygen ($O_2$) is contained in the exhaust gas discharged from the ordinary diesel engine and the lean-burn gasoline engine, the oxygen contained in the exhaust gas is used for oxidizing the nitrogen monoxide (NO) discharged from the engine to the nitrogen dioxide ($NO_2$) through the use of the oxidation catalytic function of the catalyst noble metal. The resultant nitrogen dioxide is occluded in the form of the chlorides such as nitrate and the like in the NOx occlusion agent such as barium having NOx occluding function, which results in the purification of the NOx.

But, if the aforementioned state is continued, the NOx occlusion agent having NOx occluding function will be entirely turned into the nitrate, and thus the NOx occluding function is lost. Then excessive rich combustion exhaust gas (rich spike gas) is generated by changing the engine operating condition and injecting the fuel into the exhaust passage so as to be supplied to the catalyst. The excessive rich combustion exhaust gas contains small amounts of coexisting oxygen in the exhaust gas at the high concentration of the reducing agents such as carbon monoxide (CO) and hydrocarbon (HC) and the high exhaust temperature.

In the fuel-rich state where the small amount of oxygen is contained in the exhaust gas at high concentration of the reducing agent and the high exhaust gas temperature, the nitrate having occluded the NOx releases the nitrogen dioxide and returns to the original state, that is, barium or the like. As the oxygen content of the exhaust gas is low, the released nitrogen dioxide is converted into water, carbon dioxide ($CO_2$), and nitrogen ($N_2$) on the catalyst noble metal such as platinum having the oxidizing function by using carbon monoxide, hydrocarbon (HC) and hydrogen ($H_2$) as the reducing agent.

When the NOx occlusion capacity becomes close to saturation, the NOx purification system provided with the NOx occlusion reduction catalyst performs NOx regeneration for supplying reduction composition exhaust gas to the catalyst so as to regenerate the catalyst by releasing the occluded NOx. The reduction composition exhaust gas is generated by increasing the air/fuel ratio of the exhaust gas into the rich state by increasing the fuel amount so as to have the air/fuel ratio higher than the theoretical value to thereby decrease the oxygen concentration of the inflow exhaust gas. The fuel-rich control for recovery of the NOx occlusion capacity is performed to release the absorbed NOx, and the released NOx is reduced by the noble metal catalyst.

In the exhaust gas purification system provided with the NOx occlusion reduction catalyst, the NOx in the exhaust gas is occluded and adsorbed in the NOx occlusion reduction catalyst at the time of the lean combustion in ordinary operation. At the same time, SOx generated by combustion of sulfur contained in the oil or the fuel is also occluded and adsorbed in the NOx occlusion reduction catalyst together with the NOx. The SOx exhibits stronger affinity for the NOx occlusion agent than the NOx to thereby generate the stable compound. Accordingly, the NOx occlusion capacity will be deteriorated as the SOx is occluded, which is the major cause of deterioration in the NOx purification capacity.

Therefore, the engine operating condition is then changed to conduct the sulfur poisoning regeneration control (sulfur purge) for generating the high temperature fuel-rich exhaust gas so as to be supplied to the NOx occlusion reduction catalyst. The SOx is then desorbed and released so as to recover the NOx purification performance of the NOx occlusion reduction catalyst.

Under the sulfur poisoning regeneration control, the high concentration exhaust gas as the uncombusted HC is generated at the temperature around 600°, which may largely deteriorate mileage. Further, the extreme rich condition may deteriorate the state of the exhaust gas, or adversely affect durability of the engine because of to dilution of the fuel oil.

Therefore, the frequency of the sulfur poisoning regeneration control has to be suppressed to a bare minimum. It becomes essential to accurately estimate the deterioration level of the catalyst, that is, the reduction in the amount of the occluded NOx for maintaining the high catalytic performance under the sulfur poisoning regeneration control at the appropriate timing based on the deterioration level of the catalyst derived from accurate decrease in the amount of occluded NOx.

As described in Japanese patent application Kokai publication No. 2002-47919, any of the lambda sensor, the hydrocarbon sensor, the carbon monoxide sensor and the hydrogen sensor is disposed downstream of the nitrogen oxide storage catalyst (corresponding to the NOx occlusion reduction catalyst) to measure the time interval (corresponding to Tx shown in FIG. 2) between switching of the air/fuel mixture (air/fuel ratio) from the lean combustion to the rich combustion (corresponding to T1 shown in FIG. 2), and leakage of the dense exhaust gas passing through the nitrogen oxide storage catalyst (corresponding to T2 shown in FIG. 2). The disclosed method of inspecting the work capacity of the nitrogen oxide storage catalyst uses the resultant time difference Tx for estimating deterioration in the storage capacity of the nitrogen oxide storage material.

In the aforementioned inspection method, the consumption amount of such reducing agents as hydrocarbon, carbon monoxide and hydrogen in the fuel rich exhaust gas composition corresponds to the occluded NOx amount. Thus, the deterioration level of the NOx occlusion reduction catalyst is determined by calculating the NOx occlusion amount based on the time Tx elapsing from the time point T1 at which the air/fuel mixture (air/fuel ratio) is switched from the fuel lean combustion state to the rich combustion state, to the time point T2 at which the aforementioned component leaks to the downstream of the nitrogen oxide storage catalyst.

But, at the initial stage (time Tb shown in FIG. 2) of the rich air/fuel ratio control under the NOx regeneration control in the above-described determination process, the oxygen adsorbed on the surface of the catalyst during the lean operation is released. Thus, the reducing agent such as the hydrocarbon, carbon monoxide and hydrogen detectable by the aforementioned detection sensor is likely to react with the thus released oxygen in preference to the reduction with the NOx. Therefore, the inspection method based on the time Tx which includes the time period Tb (shown in FIG. 2) can fail to provide the accurate value of the NOx occlusion amount.
Patent Document 1: Japanese patent application Kokai publication No. 2002-47919 (paragraph [0036])

DISCLOSURE OF THE INVENTION

Problem to be Solved by the Invention

The present invention has been made to solve the aforementioned problem, and it is an object of the present invention to provide a NOx purification method and a NOx purification system for accurately estimating the sulfur poisoning amount, based on which the sulfur poisoning regeneration control is performed at appropriate frequency to avoid excessive sulfur poisoning regeneration control so as to prevent deterioration of mileage.

For the purpose of achieving the object, provided is a method for controlling a NOx purification system with a NOx occlusion reduction catalyst disposed in an exhaust passage of an internal combustion engine, which occludes a NOx when an air/fuel ratio of an exhaust gas is in a lean state, and releases and reduces the occluded NOx when the air/fuel ratio is in a rich state. The method includes the steps of executing a NOx regeneration control for bringing the air/fuel ratio of the exhaust gas into a rich state in order to recover a NOx occlusion capacity of the NOx occlusion reduction catalyst, and executing a sulfur poisoning regeneration control for bringing the air/fuel ratio of the exhaust gas into a rich state in order to recover deterioration of the NOx occlusion reduction catalyst caused by sulfur poisoning. An oxygen concentration sensor and a reducing agent concentration sensor for detecting a concentration of the reducing agent are disposed downstream of the NOx occlusion reduction catalyst. A level of deterioration of the NOx occlusion reduction catalyst caused by the sulfur poisoning is determined based on a time between a time point at which the oxygen concentration sensor detects a marked decrease in the oxygen concentration and a time point at which the reducing agent concentration sensor detects a marked increase in the concentration of the reducing agent upon execution of the NOx regeneration control.

When the rich air/fuel ratio control for NOx regeneration is completed to return to the lean combustion state (normal combustion), the NOx occlusion reduction catalyst takes in the oxygen contained in the exhaust gas in the fuel lean state through adsorption and occlusion to the surface of the NOx occlusion reduction catalyst and inside the NOx occlusion agent, and the oxygen is released at the initial stage of the rich air/fuel ratio control under the NOx regeneration control.

In the present invention, the determination is made with respect to the deterioration level of the NOx occlusion reduction catalyst in consideration of consumption of the reducing agents such as hydrogen, carbon monoxide, and hydrocarbon by the released oxygen. The determination will be described referring to FIG. 2 representing the time-series outputs from the binary $\lambda$ sensor at the downstream side, the hydrogen sensors at the upstream and the downstream sides of the NOx occlusion reduction catalyst under the NOx regeneration control.

At the initial stage of the NOx regeneration control, the oxygen adsorbed on the surface of the NOx occlusion reduction catalyst is consumed by the hydrocarbon (HC), the carbon monoxide (CO), the hydrogen ($H_2$) and the like in the rich exhaust gas composition to thereby bring the catalyst surface into the reduced atmosphere. The aforementioned time point is detected based on the marked decrease (rapid increase in $\lambda$ shown in FIG. 2) in the oxygen concentration by the oxygen concentration sensor downstream of the NOx occlusion reduction catalyst. That is, the time point around the theoretical air/fuel ratio, that is, the time point (T3) at which the output markedly rises up is detected by the oxygen concentration sensor such as the binary $\lambda$ sensor. The marked decrease in the oxygen concentration means that it is different from the small decrease (time point T1) in the oxygen concentration immediately after the start of the previous rich air/fuel ratio control.

After the end of the oxygen release, the time point at which consumption of the reducing agent by the NOx released from the NOx occlusion reduction catalyst is completed is detected based on the increase in the concentration of the reducing agent by the reducing agent concentration sensor downstream of the NOx occlusion reduction catalyst. That is, the time point (T2 shown in FIG. 2) at which the output markedly rises up is detected by the reducing agent concentration sensor.

Next, the time (Ta) between those two time points (T3, T2) is used for estimating the NOx release amount under the NOx regeneration control, that is, NOx occlusion amount before the start of the NOx regeneration control by referring to the map data showing the relation between the time (Ta) and the NOx occlusion amount. Further, based on the comparison between the estimated value of the NOx occlusion amount and the reference NOx occlusion amount (for example, the saturated NOx occlusion amount of the new catalyst) is used for determining the level of deterioration of the NOx occlusion reduction catalyst caused by sulfur poisoning. Thus, the level of deterioration caused by the sulfur poisoning can be accurately determined. Further, as the catalyst temperature may markedly influence the relation between the aforementioned time (Ta) and the NOx occlusion amount, the relation between the time (Ta) and the NOx occlusion amount is expressed as the map data with respect to the catalyst temperature, or is corrected in accordance with the catalyst temperature.

In addition, the reference time for determining the deterioration with respect to the time (Ta) may be preliminarily input to the control unit in the form of the map data and the like without calculating the NOx occlusion amount so as to determine the level of deterioration of the NOx occlusion reduction catalyst caused by sulfur poisoning through comparison between the detected time (Ta) and the reference time.

In the method of controlling the NOx purification system, the oxygen concentration sensor is formed of the binary $\lambda$ sensor. In this case, the output of the binary $\lambda$ sensor changes largely at the air excess ratio $\lambda$ of around 1. This makes it easy to detect the marked decrease in the oxygen concentration, and to control the decrease. The hydrogen concentration can be measured relatively easily. As the hydrogen concentration can be measured relatively easily, the method of controlling the NOx purification system is preferably configured such that the concentration of the reducing agent to be detected is the hydrogen concentration, and the reducing agent concentration sensor is the hydrogen concentration sensor. The use of the hydrogen concentration sensor makes it possible to confirm the hydrogen consumption on the catalytic surface, and ensure to confirm the end of the sulfur purge.

For the purpose of achieving the aforementioned object, a NOx purification system includes a NOx occlusion reduction catalyst disposed in an exhaust passage of an internal combustion engine, which occludes a NOx when an air/fuel ratio of an exhaust gas is in a lean state, and releases and reduces the occluded NOx when the air/fuel ratio is in a rich state, and a control unit for executing a NOx regeneration control for bringing the air/fuel ratio of the exhaust gas into a rich state in order to recover a NOx occlusion capacity of the NOx occlusion reduction catalyst and executing a sulfur poisoning regeneration control for bringing the air/fuel ratio of the exhaust gas into a rich state in order to recover deterioration of the NOx occlusion reduction catalyst caused by the sulfur poisoning. An oxygen concentration sensor and a reducing agent concentration sensor for detecting a concentration of the reducing agent are disposed downstream of the NOx occlusion reduction catalyst. The control unit is configured so as to determine a level of deterioration of the NOx occlusion reduction catalyst caused by the sulfur poisoning based on a time between a time point at which the oxygen concentration sensor detects a marked decrease in an oxygen concentration and a time point at which the reducing agent concentration sensor detects a marked increase in the concentration of the reducing agent upon execution of the NOx regeneration control. According to the NOx purification system of this construction, the method of controlling the NOx purification system can be carried out and the similar action effects can be obtained.

In the aforementioned NOx purification system, the oxygen concentration sensor is formed as the binary $\lambda$ sensor. The binary $\lambda$ sensor has the output largely changed at the air excess ratio $\lambda$ of around 1. This makes it possible to easily detect the marked decrease in the oxygen concentration, and to easily control it. Further, as the hydrogen concentration can be relatively easily measured, it is preferable that the hydrogen concentration is the concentration of the reducing agent, and the hydrogen concentration sensor is formed as the reducing agent concentration sensor.

Advantage of the Present Invention

According to the NOx purification method and the NOx purification system of the present invention, in the NOx purification system provided with the NOx occlusion reduction catalyst for purifying the NOx in the exhaust gas discharged from the internal combustion engine such as the diesel engine, the determination is made with respect to the level of deterioration of the NOx occlusion reduction catalyst caused by the sulfur poisoning in consideration of the amount of the oxygen which is adsorbed in the NOx occlusion reduction catalyst, and is released in the fuel rich state under the NOx regeneration control. Thus, the NOx purification method and the NOx purification system make it possible to perform the estimation accurately.

The accurate and appropriate sulfur poisoning regeneration control is performed while making the accurate determination with respect to the level of deterioration of the NOx occlusion reduction catalyst by accurately calculating the NOx occlusion amount. This makes it possible to perform the sulfur poisoning regeneration control at appropriate frequency so as to avoid the excessive sulfur poisoning regeneration control. As a result, deterioration of mileage can be prevented, and durability of the NOx occlusion reduction catalyst can be improved.

DESCRIPTION OF CODES

Figure 1:
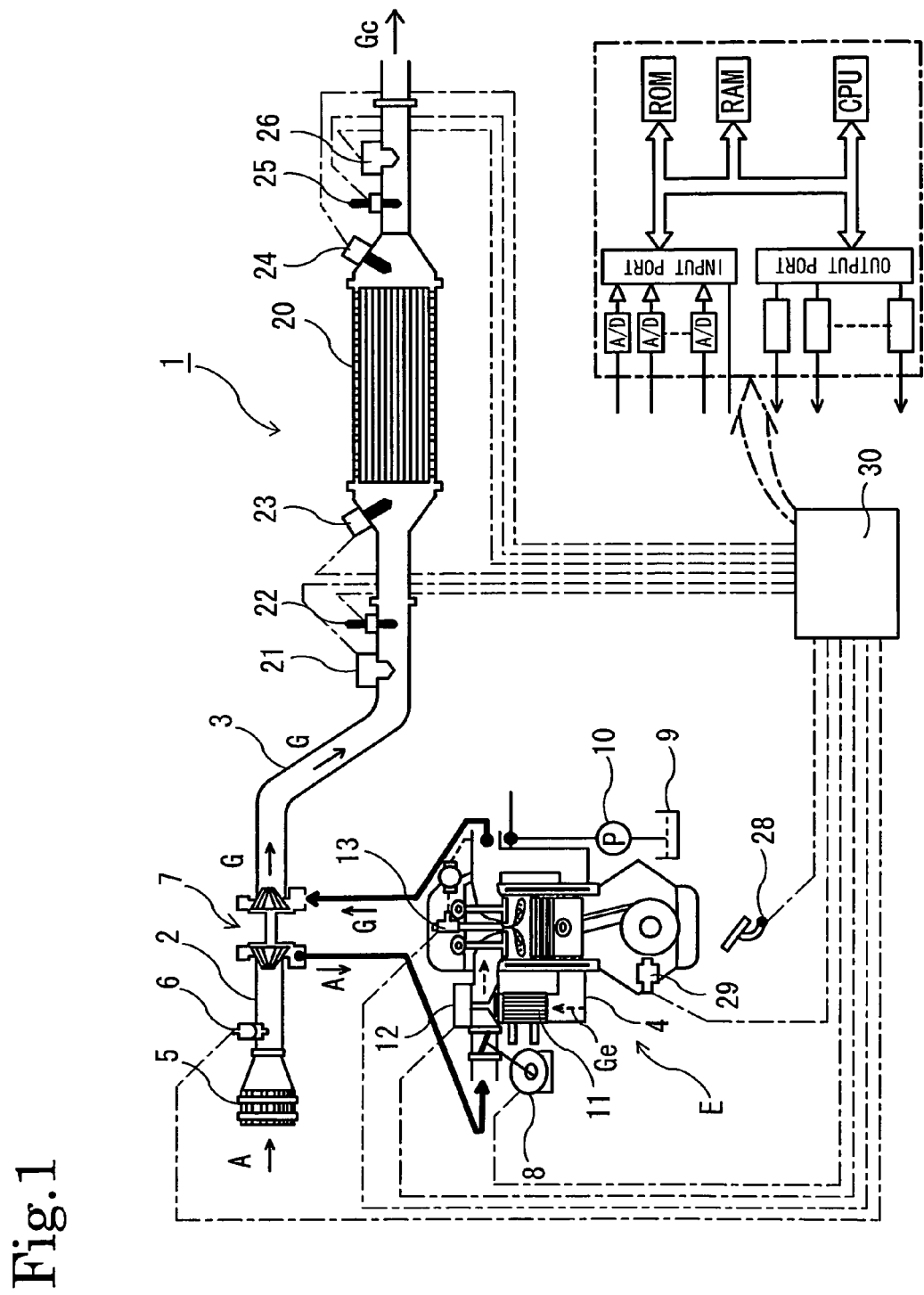
FIG. 1 shows a structure of a NOx purification system according to an embodiment of the present invention.

E Engine (internal combustion engine)
1 NOx purification system
3 Exhaust passage
20 Occlusion reduction catalyst (exhaust gas purification device: catalytic converter)
25 Hydrogen concentration sensor at downstream side
26 Binary $\lambda$ sensor
30 Control unit
T1 At the start of rich air/fuel ratio control
T2 At the completion of NOx release
T3 At the completion of oxygen release (at the start of NOx release)
T4 At the completion of rich air/fuel ratio control
Ta NOx release time
Tb Oxygen release time

DESCRIPTION OF THE PREFERRED EMBODIMENT

A NOx purification method and a NOx purification system according to an embodiment of the present invention will be described referring to the drawings. The present invention is applicable to the whole lean burn engine as represented by the diesel engine. The description will be made with respect to the diesel engine hereinafter. The rich state of the exhaust gas does not necessarily mean the fuel rich combustion in the cylinder. The aforementioned state means one in which the ratio of the amount of air supplied to the exhaust gas flowing into the NOx occlusion reduction catalyst to the fuel amount (including the amount of the fuel that has been combusted in the cylinder) is close to the theoretical air/fuel ratio, or the fuel amount is larger than the theoretical air/fuel ratio.

FIG. 1 shows a structure of a NOx purification system 1 according to an embodiment of the present invention. In the NOx purification system 1, a NOx occlusion reduction catalyst (exhaust gas purification device: catalytic converter) 20 is disposed in an exhaust passage 3 of an engine (internal combustion engine) E.

The NOx occlusion reduction catalyst 20 is formed by applying a catalytic coat layer to a monolithic catalyst which is formed of cordierite or silicon carbide (SiC) super-thin stainless steel. The catalytic coat layer is formed by carrying the catalyst metal such as platinum (Pt) or paradium (Pd), and the NOx occlusion material (NOx occlusion substance) such as barium (Ba). The carrier of the monolithic catalyst structure includes a plurality of cells. The catalytic coat layer applied to the inner wall of the cell has the large surface area, thus improving the contact efficiency with the exhaust gas.

When the oxygen concentration of the exhaust gas is high (in the fuel-lean state), the NOx occlusion reduction catalyst 20 allows the NOx occlusion material to occlude the NOx in the exhaust gas to purify the NOx in the exhaust gas. In addition, when the oxygen concentration of the exhaust gas is low or zero (in the fuel rich state), the occluded NOx is released and reduced by the catalytic action of the catalyst metal, thus preventing leakage of the NOx into the atmosphere.

A control unit (ECU: engine control unit) 30 is provided for executing the general control of operation of the engine E, and the control for recovering the NOx purification capacity of the NOx occlusion reduction catalyst 20. An air excess ratio ($\lambda$) sensor (oxygen concentration sensor) 21 at the upstream side, a hydrogen concentration sensor 22 at the upstream side, and an exhaust gas temperature sensor 23 at the upstream side are disposed upstream (inlet side) of the NOx occlusion reduction catalyst 20. An exhaust gas temperature sensor 24 at the downstream side, a hydrogen concentration sensor 25 at the downstream side, and a binary $\lambda$ sensor (oxygen concentration sensor) 26 are disposed downstream of the NOx occlusion reduction catalyst 20. The respective outputs from the aforementioned sensors are input to the control unit (ECU). The binary $\lambda$ sensor 26 has the output characteristic markedly changed at the theoretical air/fuel ratio of $\lambda$ equal to the value of 1. And in the embodiment, the hydrogen concentration sensor is employed as the sensor for detecting the concentration of the reducing agent in the exhaust gas so as to ensure the confirmation of the hydrogen consumption on the catalytic surface and the completion of the sulfur purge. Besides the hydrogen concentration sensor, the sensor for detecting the concentration of the carbon monoxide and hydrocarbon can be employed.

The control unit (ECU) 30 is formed of a digital computer in which a central processing unit (CPU), a random access memory (RAM), a read only memory (ROM), an input port and an output port are connected via a bilateral path. In the embodiment, in addition to such basic controls as the injection control and the fuel injection timing control for the engine E, the control unit 30 executes the engine combustion control, the NOx occlusion reduction catalyst control, the exhaust throttle valve control, the intake throttle valve control, the catalytic deterioration determination control, and the sulfur poisoning regeneration control (sulfur purge control).

In order to execute the aforementioned controls, the control unit 30 receives detection values (output signals) from a load sensor 28 based on the accelerator opening, a crank angle sensor 29 attached to an engine crankshaft and the like. In addition, the control unit 30 outputs signals for controlling an intake throttle valve 8 of the engine E, an EGR valve 12, a fuel injection valve 13 of a common rail electronic control fuel injection device for the fuel injection and the like.

In the NOx purification system 1, intake air A sucked to the engine E passes through an air purification device 5 and a mass air flow sensor (MAF sensor) 6 in an intake passage 2, so as to be compressed/boosted by a compressor of a turbo charger 7. The intake air A is cooled by an intercooler (not shown) to have the amount adjusted by the intake throttle valve 8 so as to be supplied into the cylinder through the intake manifold. The mass airflow sensor 6 measures the intake air amount. The voltage corresponding to the flow rate of the intake air A is input to the control unit (ECU) by the mass airflow sensor 6. The intake throttle valve 8 is controlled based on the control signal from the control unit (ECU). The fuel from the fuel tank 9 which has been boosted by the fuel pump 10, is injected to the air A sucked into the cylinder via the common rail and the fuel injection valve 13 for combustion.

Exhaust gas G generated by the combustion in the cylinder flows from the exhaust manifold to the exhaust passage 3 to drive the turbine of the turbocharger 7. The gas is then turned into purified exhaust gas Gc after passing the NOx occlusion reduction catalyst 20 so as to be discharged into the atmosphere through a muffler (not shown). The exhaust gas G partially passes a high efficiency EGR cooler 11 in the EGR passage 4 as EGR gas Ge to have the amount adjusted by the EGR valve 12 disposed at the outlet side of the EGR passage 4. The aforementioned gas is recirculated to the intake manifold downstream of the intake throttle valve 8. According to the embodiment, large amounts of the EGR gas are configured to be able to recirculate.

And in the present invention, the level of deterioration of the NOx occlusion reduction catalyst 20 caused by the sulfur poisoning is determined based on the time period from the time point at which the binary $\lambda$ sensor 26 downstream side of the NOx occlusion reduction catalyst 20 detects a marked decrease in the oxygen concentration to the time point at which the hydrogen concentration sensor at the downstream side as the reducing agent concentration sensor detects a marked increase in the hydrogen concentration under the NOx regeneration control. Under the NOx regeneration control, the air/fuel ratio of the exhaust gas is brought into the fuel-rich state in order to recover the NOx occlusion capacity of the NOx occlusion reduction catalyst 20.

Figure 2:
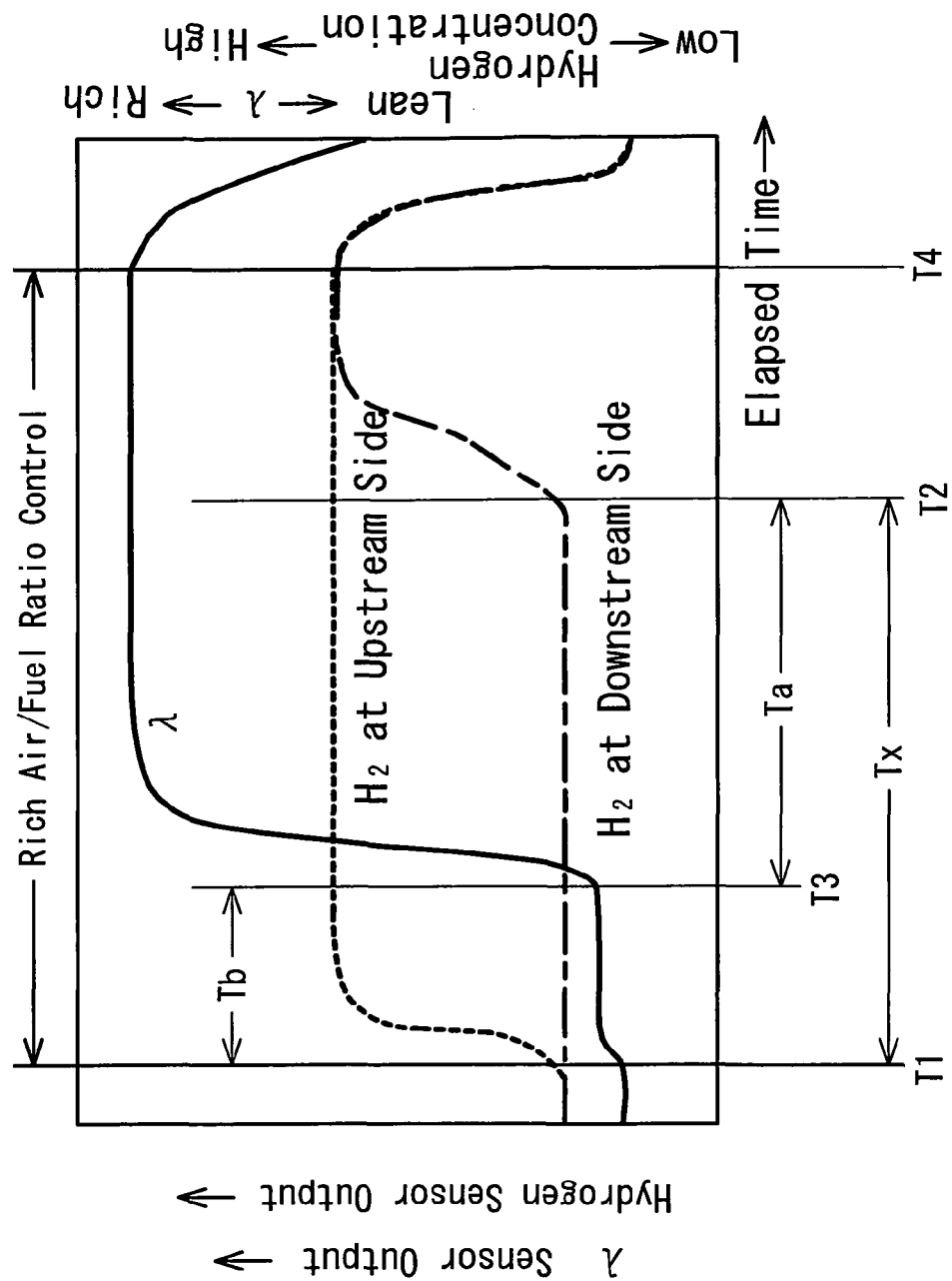
FIG. 2 shows time-series outputs of the binary $\lambda$ sensor at the downstream side, and the hydrogen sensors at the upstream and downstream sides of the NOx occlusion reduction catalyst under the NOx regeneration control.

The aforementioned details will be described referring to FIG. 2. FIG. 2 graphically shows time-series outputs from the binary $\lambda$ sensor 26 at the downstream side, the hydrogen sensors 22 and 25 at the upstream and downstream sides of the NOx occlusion reduction catalyst 20 under the NOx regeneration control, respectively.

In the lean combustion ordinary driving state, the lean operation is performed. In the state at the lean air/fuel ratio, the NOx contained in the exhaust gas is occluded in the NOx occlusion reduction catalyst 20 so as to be purified. If the NOx is occluded in the NOx occlusion reduction catalyst 20 and the NOx occlusion capacity has become nearly saturated, it is determined whether or not the occlusion amount has reached the threshold of the NOx occlusion amount of the catalyst. If it has reached the threshold, the NOx regeneration control is performed to released NOx and reduced NOx for the purification to thereby maintain the NOx purification performance. The threshold is defined by the preliminary test. Upon start of the NOx regeneration control, the rich air/fuel ratio control is started (time point T1) to switch the state of the exhaust gas to that of the rich air/fuel ratio. When the state at the rich air/fuel ratio continues, and the NOx is released to regenerate the NOx occlusion reduction catalyst 20, the rich air/fuel ratio control is completed (time point T4). The state is further switched to the lean air/fuel ratio, and the aforementioned operations will be repeatedly performed. For the period between the time points T1 and T4, the rich air/fuel ratio control is executed.

Under the NOx regeneration control, the respective outputs from the binary $\lambda$ sensor 26 at the downstream side (outlet side), the hydrogen concentration sensor 22 at the upstream side, and the hydrogen concentration sensor 25 at the downstream side of the NOx occlusion reduction catalyst 20 change as shown in FIG. 2. Based on the change, the NOx occlusion reduction catalyst 20 is regenerated, and at the same time, the NOx occlusion amount of the NOx occlusion reduction catalyst 20 is estimated to determine the deterioration level of the catalyst.

Referring to FIG. 2, when the high concentration reducing gas is supplied to the NOx occlusion reduction catalyst 20 by controlling the air/fuel ratio under the NOx regeneration control into rich state (time point T1), the output from the hydrogen sensor 22 at the upstream side ($H_2$ at the upstream side) markedly rises up corresponding to the increase in the hydrogen in the exhaust gas. That is, upon switching of the air/fuel ratio control into the rich state, the reducing agents such as the uncombusted hydrocarbon, carbon monoxide, and the hydrogen is supplied to the exhaust gas to increase the hydrogen concentration in the exhaust gas. Accordingly, the output of the hydrogen concentration sensor 22 at the upstream side ($H_2$ at the upstream side) sharply increases. The air excess ratio $\lambda$ detected by the $\lambda$ sensor 21 at the upstream side sharply decreases until the rich air/fuel ratio equal to or smaller than 1.

Meanwhile, the oxygen concentration (designated as $\lambda$) at the downstream side decreases slightly to the rich side (the air excess ratio $\lambda$ decreases to the value of 1). However, at the initial stage of the rich air/fuel ratio control, oxygen which has been adsorbed on the catalytic surface of the NOx occlusion reduction catalyst 20 upon the lean combustion is released. So the concentration is not largely decreased to the rich side. During the release of the oxygen, the reducing agent such as the hydrogen in the exhaust gas is consumed by the released oxygen. The detection value of the hydrogen sensor 25 at the downstream side is kept to a low hydrogen concentration. At the time point Tb, the catalytic surface has not been brought into a true reducing atmosphere owing to the released oxygen.

The NOx has not been released from the NOx occlusion reduction catalyst 20. Thus, the reducing agent such as the hydrogen in the exhaust gas is not always consumed by the reduction of the released NOx.

Afterwards, when the release of the oxygen that has been adsorbed on the surface of the NOx occlusion reduction catalyst 20, and the reaction between the released oxygen and the reducing agent are completed, the oxygen concentration is reduced to bring the catalytic surface into the true reducing atmosphere (time point T3). This makes it possible to release and reduce the NOx. Thus, because of the decrease in the oxygen concentration, the output ($\lambda$) of the binary $\lambda$ sensor 26 at the downstream side markedly rises up to the richer side than the output from the $\lambda$ sensor at the upstream side the time period Tb minutes late. The air excess ratio $\lambda$ becomes the value around 1.

Thereafter, when all the NOx adsorbed in the NOx occlusion reduction catalyst 20 is released (time point T2), the reducing agent in the exhaust gas cannot be consumed due to the NOx reduction. Then the concentration of the reducing agent such as the hydrogen downstream of the NOx occlusion reduction catalyst 20 becomes high, and the output from the hydrogen concentration sensor 25 at the downstream side markedly rises up in response to the increase in the hydrogen in the exhaust gas to thereby become the same as the output from the hydrogen concentration sensor 22 at the upstream side of the NOx occlusion reduction catalyst 20 (time point T4). At the time point T4, the occluded NOx is entirely released to complete the regeneration of the NOx occlusion reduction catalyst 22, thereby finishing the rich air/fuel ratio control.

By the completion of the rich air/fuel ratio control, the outputs from the $\lambda$ sensor 21 at the upstream side and from the binary $\lambda$ sensor 26 return to the output in the lean state (fuel-lean exhaust gas). Likewise, the outputs from the hydrogen concentration sensor 22 at the upstream side and the hydrogen concentration sensor 25 at the downstream side return to the output in the lean state.

In other words, the time point T1 at which the concentration of the reducing agent in the exhaust gas flowing into the NOx occlusion reduction catalyst 20 under the rich air/fuel ratio control can be confirmed based on the marked rise-up (increase in the hydrogen concentration) of the output from the hydrogen sensor 22 at the upstream side ($H_2$ at the upstream side). Such time point can also be confirmed based on the rise-up of the output ($\lambda$) from the binary $\lambda$ sensor 26 at the downstream side slightly to the rich side.

The time point T3 at which the release of the oxygen from the NOx occlusion reduction catalyst 20 is completed can be confirmed based on the marked rise-up of the output ($\lambda$) from the binary $\lambda$ sensor at the downstream side to the rich side. The time point T2 at which the release of the NOx from the NOx occlusion reduction catalyst 20 is completed can be confirmed based on the marked rise-up of the output ($H_2$ at the downstream side) from the hydrogen concentration sensor 25 at the downstream side.

The time Ta between those time points T3 and T2 corresponds to the time period for which the NOx is actually released from the NOx occlusion reduction catalyst 20. The time Ta, thus, corresponds to the amount of the NOx that has been occluded in the NOx occlusion reduction catalyst 20 prior to the rich air/fuel ratio control.

Based on the time Ta between those two time points T3 and T2, the NOx release amount during the NOx regeneration control, that is, the NOx occlusion amount prior to the start of the regeneration control is estimated by referring to the map data which represents the relation between the time Ta and the NOx occlusion amount. The estimated NOx occlusion amount is compared with the reference NOx occlusion amount (for example, the NOx saturation occlusion amount of the new catalyst) to determine the level of deterioration of the catalyst caused by the sulfur poisoning. Accordingly, the deterioration level owing to the sulfur poisoning can be accurately determined. The NOx saturated occlusion amount varies with the catalytic temperature of the NOx occlusion reduction catalyst 20. The catalytic temperature is estimated based on the detection values of the exhaust gas temperature sensor 23 at the upstream side and the exhaust gas temperature sensor 24 at the downstream side. The NOx saturation occlusion amount at the estimated catalytic temperature is used.

Without calculating the NOx occlusion amount, the reference time relative to the time Ta for determining the deterioration may be preliminarily input to the control unit in the form of the map data and then, by comparing the detected time Ta with the reference time (correcting in accordance with the catalytic temperature if required), the level of deterioration of the NOx occlusion reduction catalyst caused by the sulfur poisoning may also be determined.

In the present invention, the NOx release time period is set to the time Ta elapsing from the time point (T3) at which the output from the binary $\lambda$ sensor 26 markedly rises to the time point (T2) at which the output from the hydrogen concentration sensor 25 at the downstream side markedly rises up rather than being set to be the time Tx elapsing from the time point (T1) at which the rich air/fuel ratio control starts to the time point (T2) at which the output from the hydrogen concentration sensor 25 at the downstream side rises up. The time Ta is used for determining the deterioration level of the catalyst so as to perform accurate and appropriate sulfur poisoning regeneration control (sulfur purge). In other words, the deterioration level of the catalyst sulfur is detected and evaluated based on the NOx adsorption amount indicating the state of the NOx occlusion reduction catalyst 20 without using the indirect information such as the fuel consumption amount.

Next, the method of controlling the NOx purification system will be described. In the embodiment, the control unit of the NOx purification system 1 is installed in the control unit 30 of the engine E for controlling the NOx purification system 1 along with the operation control of the engine E. The control unit of the NOx purification system 1 is provided with regeneration start determining means, regeneration continuation controlling means, regeneration complete determining means and the like.

Under the NOx regeneration control, the regeneration start determination means calculates a NOx discharge amount per unit of time ($\Delta$NOx) based on the engine operation state. When the accumulated discharge amount $\Sigma$NOx by its accumulation exceeds a predetermined determination value Cn, it is determined that the NOx regeneration control is to be started. Specifically, when it is determined that the estimated NOx occlusion amount as having been occluded in the NOx occlusion reduction catalyst 20 reaches the predetermined determination value, the NOx regeneration control is executed for recovering the NOx occlusion capacity of the NOx occlusion reduction catalyst 20.

In the present invention, under the desulfurization control for recovering the sulfur poisoning by the regeneration start determination means, the $\lambda$ at the downstream side detected by the binary $\lambda$ sensor 26 at the downstream side and the $H_2$ at the downstream side detected by the hydrogen concentration sensor 25 at the downstream side are monitored. When the NOx occlusion amount calculated based on the detected time Ta becomes smaller than the predetermined determination amount, or when the time Ta becomes shorter than the predetermined determination time, it is determined that the sulfur poisoning regeneration is to be started.

The regeneration continuation controlling means calculates a target exhaust gas temperature suitable and a target air/fuel ratio (target air excess ratio) as the stoichiometric air/fuel ratio (theoretical air/fuel ratio) or rich air/fuel ratio for the NOx regeneration and the sulfur poisoning regeneration, respectively, by executing the intake air system rich control for decreasing the intake air amount and the fuel rich control for increasing the fuel amount. The regeneration continuation means controls the intake system and the fuel system such that the exhaust gas temperature becomes the target exhaust gas temperature, and the air/fuel ratio (air excess ratio $\lambda$) becomes the target air/fuel ratio (target air excess ratio) for maintaining and continuing the target state.

Under the NOx regeneration control, the target exhaust gas temperature is set depending on the catalyst approximately within the range from 200° C. to 600° C. The target air/fuel ratio at the position of the $\lambda$ sensor 21 at the upstream side is set depending on the catalyst approximately within the range from 0.8 to 1.0 in terms of the air excess ratio ($\lambda$). In case of the sulfur poisoning regeneration, the target exhaust gas temperature is set depending on the catalyst approximately within the range from 500° to 750° C. The target air/fuel ratio is set depending on the catalyst approximately within the range from 0.8 to 1.0 in terms of to the air excess ratio ($\lambda$).

Under the NOx regeneration control, when the continued time for the NOx regeneration control exceeds the predetermined time, the regeneration complete determining means determines that the NOx regeneration control is to be completed. Alternatively, the NOx release amount from the NOx occlusion reduction catalyst 20 per unit time is calculated based on the engine operation state. When the accumulated NOx release amount by accumulation exceeds the predetermined determination value, it is determined that the NOx regeneration control is to be completed. Under the sulfur poisoning regeneration control, for example, the sulfur purge amount is summed. When the resultant accumulated sulfur purge amount exceeds the total sulfur amount at the start of the regeneration, it is determined that the sulfur poisoning regeneration control is to be completed.

According to the method of controlling the NOx purification system, and the thus structured NOx purification system 1, the deterioration level of the catalyst caused by the sulfur poisoning is estimated based on the time Ta for controlling the NOx regeneration to execute the sulfur poisoning regeneration control. This makes it possible to execute the sulfur poisoning regeneration control at an appropriate frequency. Therefore, the excessive execution of the sulfur poisoning regeneration control can be avoided, which thus prevents deterioration of mileage.

INDUSTRIAL APPLICABILITY

The method of controlling the NOx purification system, and the NOx purification system according to the present invention for providing excellent advantages as described above are mounted in the internal combustion engine of the vehicle and can be efficiently utilized for the NOx purification system provided with the NOx occlusion reduction catalyst and the control unit 30 for executing the NOx regeneration control and the sulfur poisoning regeneration control.

What is claimed is:

1. A method of controlling a NOx purification system provided with a NOx occlusion reduction catalyst disposed in an exhaust passage of an internal combustion engine, which occludes NOx when an air/fuel ratio of an exhaust gas is in a lean state, and releases and reduces the occluded NOx when the air/fuel ratio is in a rich state, the method comprising the steps of:

executing a NOx regeneration control for bringing the air/fuel ratio of the exhaust gas into a rich state in order to recover a NOx occlusion capacity of the NOx occlusion reduction catalyst; and executing a sulfur poisoning regeneration control for bringing the air/fuel ratio of the exhaust gas into a rich state in order to recover the deterioration of the NOx occlusion reduction catalyst caused by sulfur poisoning;

disposing an oxygen concentration sensor and a reducing agent concentration sensor downstream of said NOx occlusion reduction catalyst; and determining a level of the deterioration of said NOx occlusion reduction catalyst caused by the sulfur poisoning based on a time between a time point at which said oxygen concentration sensor detects a marked decrease in the oxygen concentration and a time point at which said reducing agent concentration sensor detects a marked increase in the concentration of the reducing agent, upon execution of said NOx regeneration control.

2. The method of controlling a NOx purification system according to claim 1, wherein:

said oxygen concentration sensor is a binary λ sensor;

the concentration of said reducing agent is a hydrogen concentration; and said reducing agent concentration sensor is a hydrogen concentration sensor.

3. A NOx purification system comprising a NOx occlusion reduction catalyst disposed in an exhaust passage of an internal combustion engine, which occludes NOx when an air/fuel ratio of an exhaust gas is in a lean state, and releases and reduces the occluded NOx when the air/fuel ratio is in a rich state, and a control unit for executing a NOx regeneration control for bringing the air/fuel ratio of the exhaust gas into a rich state in order to recover a NOx occlusion capacity of the NOx occlusion reduction catalyst and executing a sulfur poisoning regeneration control for bringing the air/fuel ratio of the exhaust gas into a rich state in order to recover deterioration of the NOx occlusion reduction catalyst caused by the sulfur poisoning, wherein:

an oxygen concentration sensor and a reducing agent concentration sensor downstream of said NOx occlusion reduction catalyst;

said control unit determines a level of deterioration of said NOx occlusion reduction catalyst caused by the sulfur poisoning based on a time between a time point at which said oxygen concentration sensor detects a marked decrease in an oxygen concentration and a time point at which said reducing agent concentration sensor detects a marked increase in the concentration of the reducing agent upon execution of said NOx regeneration control.

4. The NOx purification system according to claim 3, wherein:

said oxygen concentration sensor is a λ binary sensor;

the concentration of said reducing agent is a hydrogen concentration; and said reducing agent concentration sensor is a hydrogen concentration sensor.

* * * * *